United States Patent [19]

Nelson

[11] E Re. 29,270

[45] Reissued June 21, 1977

[54] FLOATING COVER FOR A TANK

[76] Inventor: Ardell H. Nelson, 4055 Hollister Road, Houston, Tex. 77055

[22] Filed: Sept. 9, 1975

[21] Appl. No.: 611,614

Related U.S. Patent Documents

Reissue of:

[64] Patent No.: 3,861,555
Issued: Jan. 21, 1975
Appl. No.: 317,371
Filed: Dec. 22, 1972

[52] U.S. Cl. ..... 220/220; 220/221; 220/222

[51] Int. Cl.[2] ..... B65D 87/18

[58] Field of Search ..... 220/216–227; 4/172.12, 172.13, 172.14; 61/.5

[56] References Cited

UNITED STATES PATENTS

| | | | |
|---|---|---|---|
| 1,574,013 | 2/1926 | Wiggins | 220/219 |
| 1,716,491 | 6/1929 | Griffin | 220/219 |
| 2,089,645 | 8/1937 | Dickman | 220/227 |
| 2,563,016 | 8/1951 | Feild | 220/225 |
| 3,104,775 | 9/1963 | Champagnat | 220/220 |
| 3,319,329 | 5/1967 | Knutsen et al. | 220/220 X |
| 3,409,165 | 11/1968 | Creith | 220/216 |
| 3,493,143 | 2/1970 | Thompson et al. | 220/218 |
| 3,587,911 | 6/1971 | Creith | 220/220 |

FOREIGN PATENTS OR APPLICATIONS

| | | | |
|---|---|---|---|
| 1,241,869 | 8/1960 | France | 220/218 |
| 1,116,442 | 5/1956 | France | 220/216 |

*Primary Examiner*—William Price
*Assistant Examiner*—Stephen Marcus
*Attorney, Agent, or Firm*—Arnold, White & Durkee

[57] ABSTRACT

In a floating cover for inside a tank a plurality of spaced parallel support bars extend across the tops of laterally spaced horizontal pontoons that support them. Metal sheets covering the spaces between the bars have edge portions resting on the bars and clamped against them by clamping bars to form a deck. The deck may be provided with vertical sleeves, in which posts of different lengths can be mounted for spacing the deck different distances from the bottom of a tank.

18 Claims, 10 Drawing Figures

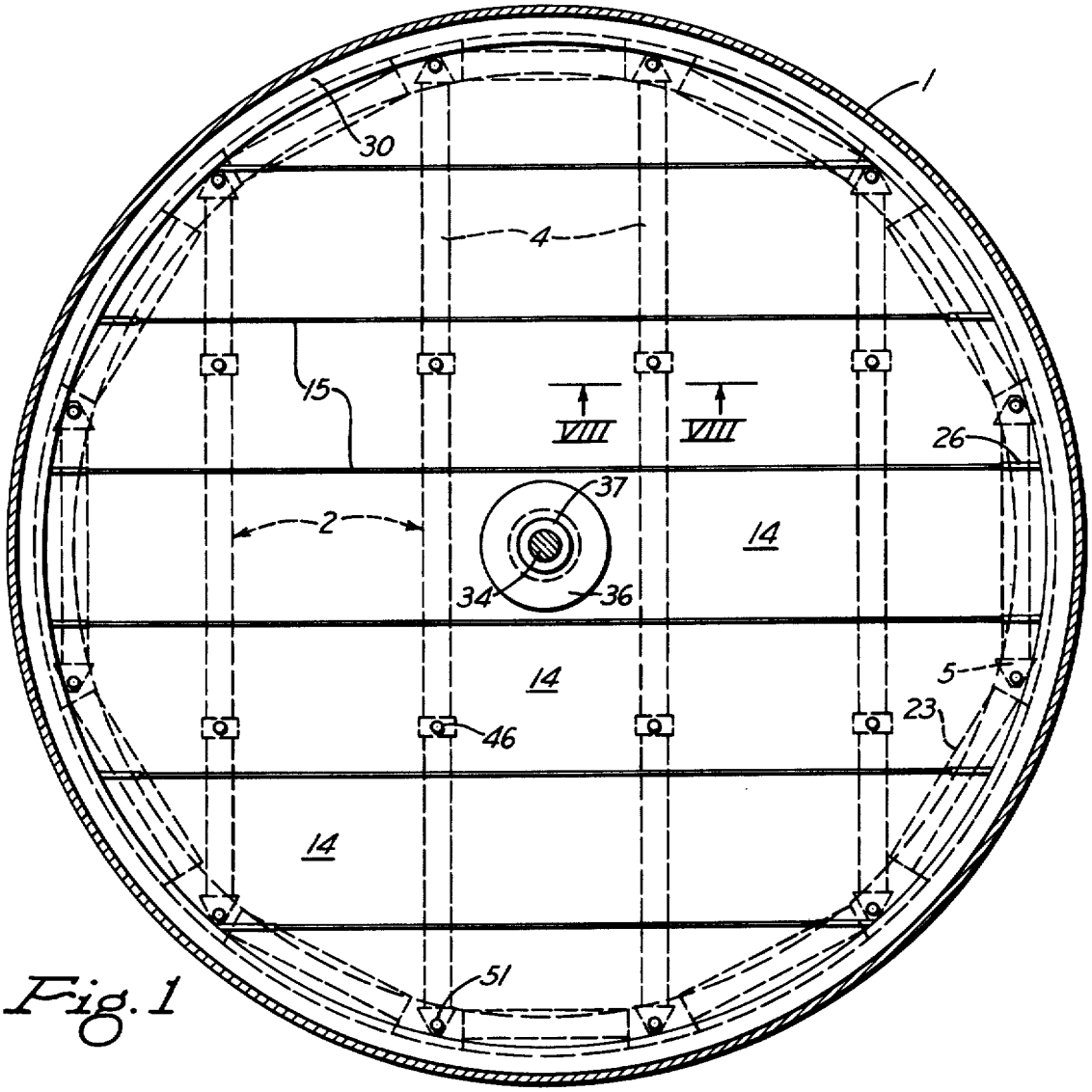
Fig. 1
Fig. 2
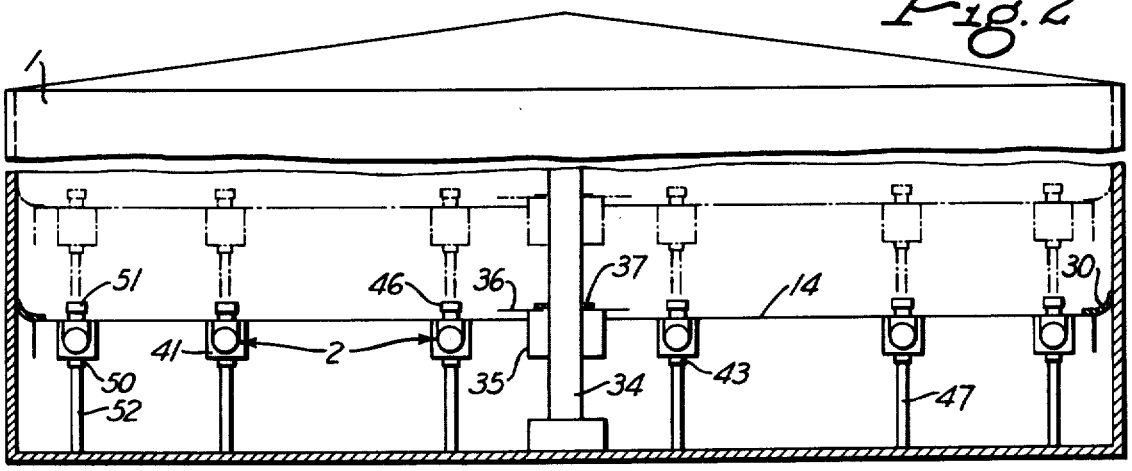

FLOATING COVER FOR A TANK

Matter enclosed in heavy brackets [ ] appears in the original patent but forms no part of this reissue specification; matter printed in italics indicates the additions made by reissue.

It is common practice to provide tanks containing volatile liquids with internal floating covers that rise and fall in the tanks in accordance with the depth of the liquid therein. These covers reduce or eliminate the air space above the liquid and thereby control evaporation which otherwise would cause loss of a considerable amount of the liquid and also would cause air pollution. It also is not uncommon to mount vertical posts in such a cover for limiting the distance that it can move downwardly in a tank so that the cover will not touch the equipment beneath it in the tank when the liquid level is low. When it is desired to clean out the bottom of the tank, it may be necessary for the cover to be at a higher level to provide enough room beneath it for workmen. This has been accomplished by adjusting the posts downwardly through the cover to increase their length below it. However, in order to have posts long enough to do this, they normally extend a considerable distance above the cover, whereby they limit the distance the cover can rise in the tank and hence the capacity of the tank, because the posts will engage the roof of the tank. Also, in floating covers known heretofore, organic sealing materials have been used between the edges of the metal panels forming the covers which also have required a great many holes for fasteners. These seals have not stood up well under the chemical reaction caused by the liquids and vapors in the tanks. The sealants usually deteriorate in two or three years of service and thus reduce the efficiency of the covers.

It is among the objects of this invention to provide an internal floating tank cover which has an extra strong pontoon-supported deck that does not require organic sealants, which has permanently tight joints, which does not require openings through the metal sheets forming the deck for fasteners to hold the sheets in place, which can rise substantially the full height of a tank, which can move laterally in a tank and also accommodate itself to tanks that are out of round, which stops nearly all loss of liquid contents of the tank by evaporation, and in which the pontoons are easily attached to the deck and can be readily shifted laterally relative to the deck.

The preferred embodiment of the invention is illustrated in the accompanying drawings, in which FIG. 1 is a plan view of the cover in a tank shown in section;

FIG. 2 is an elevation and central vertical section of the tank showing the floating cover diagrammatically in its lowest position and in dotted lines at a higher elevation;

Figures 5, 10:
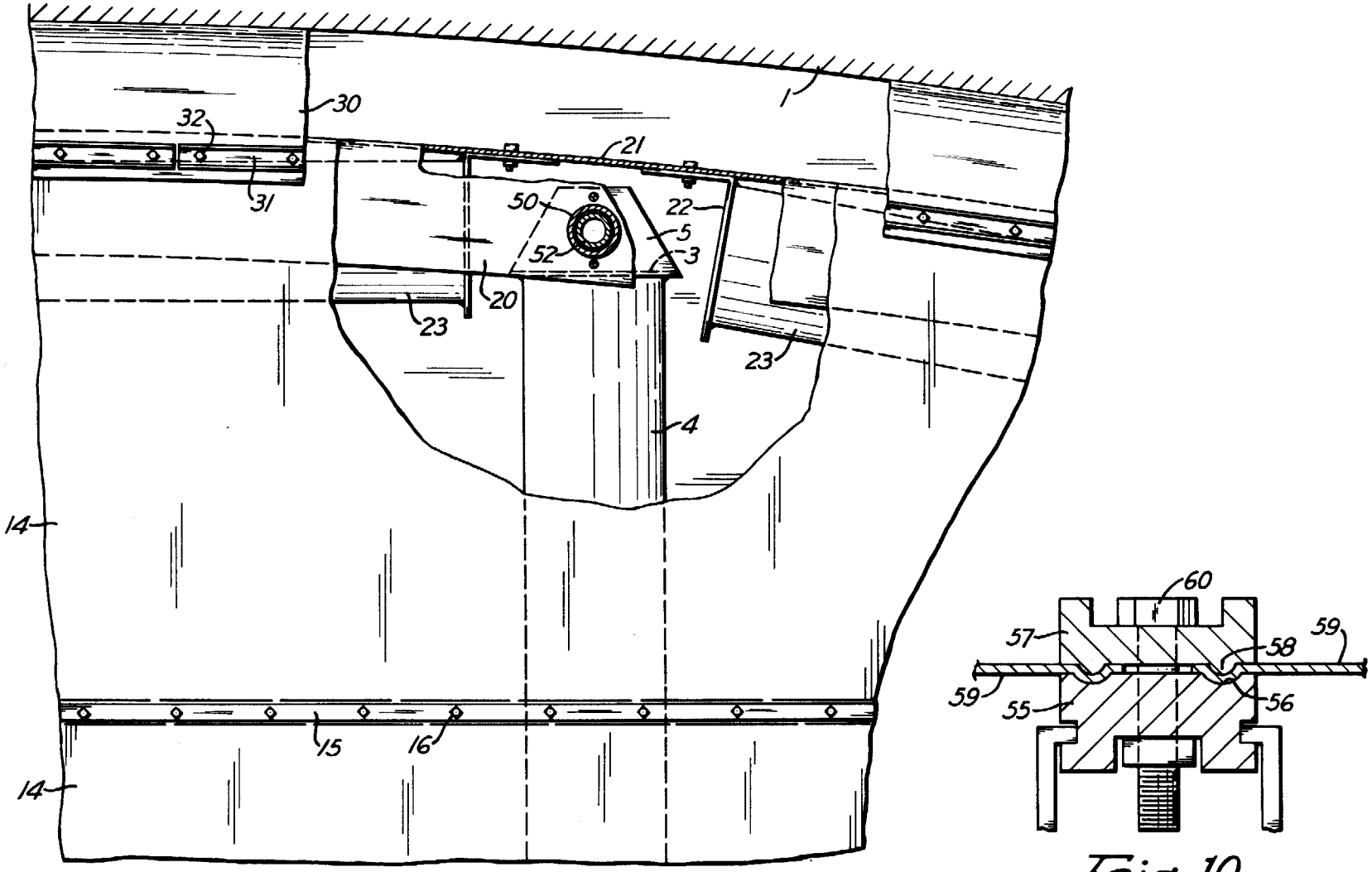
FIG. 5 is an enlarged fragmentary plan view of the cover, with parts broken away.
FIG. 10 is an enlarged fragmentary cross section of modified clamping and support bars.

Referring to FIGS. 1, 2 and 5 of the drawings, a circular tank 1 is shown in which there is a floating cover. The cover has a continuous flat deck supported by spaced parallel floatation members of pontoons 2 that can float on liquid in the tank. Preferably, the pontoons are tubular members with their ends sealed by brackets, each of which is channel shaped, with a vertical web 3 welded to the end of a pontoon tube 4 and with outwardly projecting upper and lower flanges 5.

Figure 4:
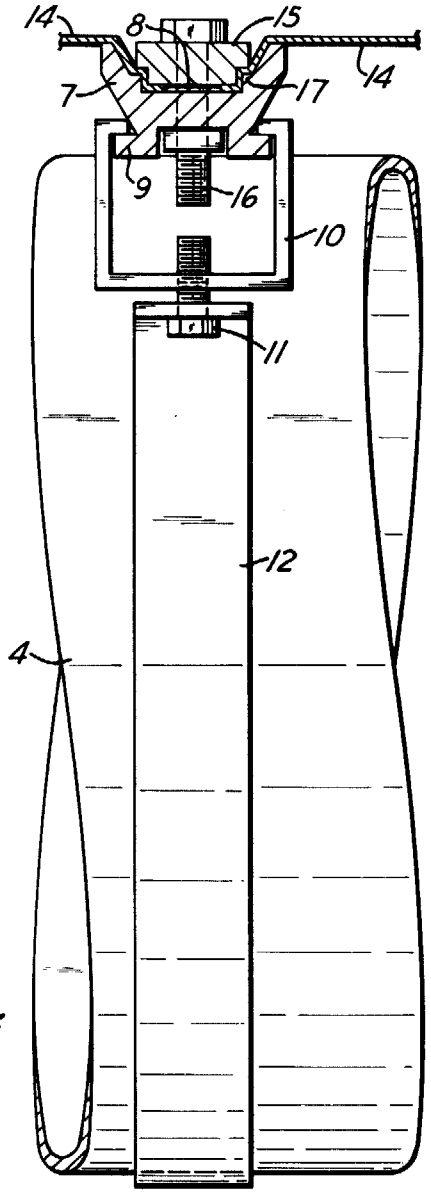
FIG. 4 is a fragmentary side view of the pontoon, with the deck in section above it.
Figure 3:
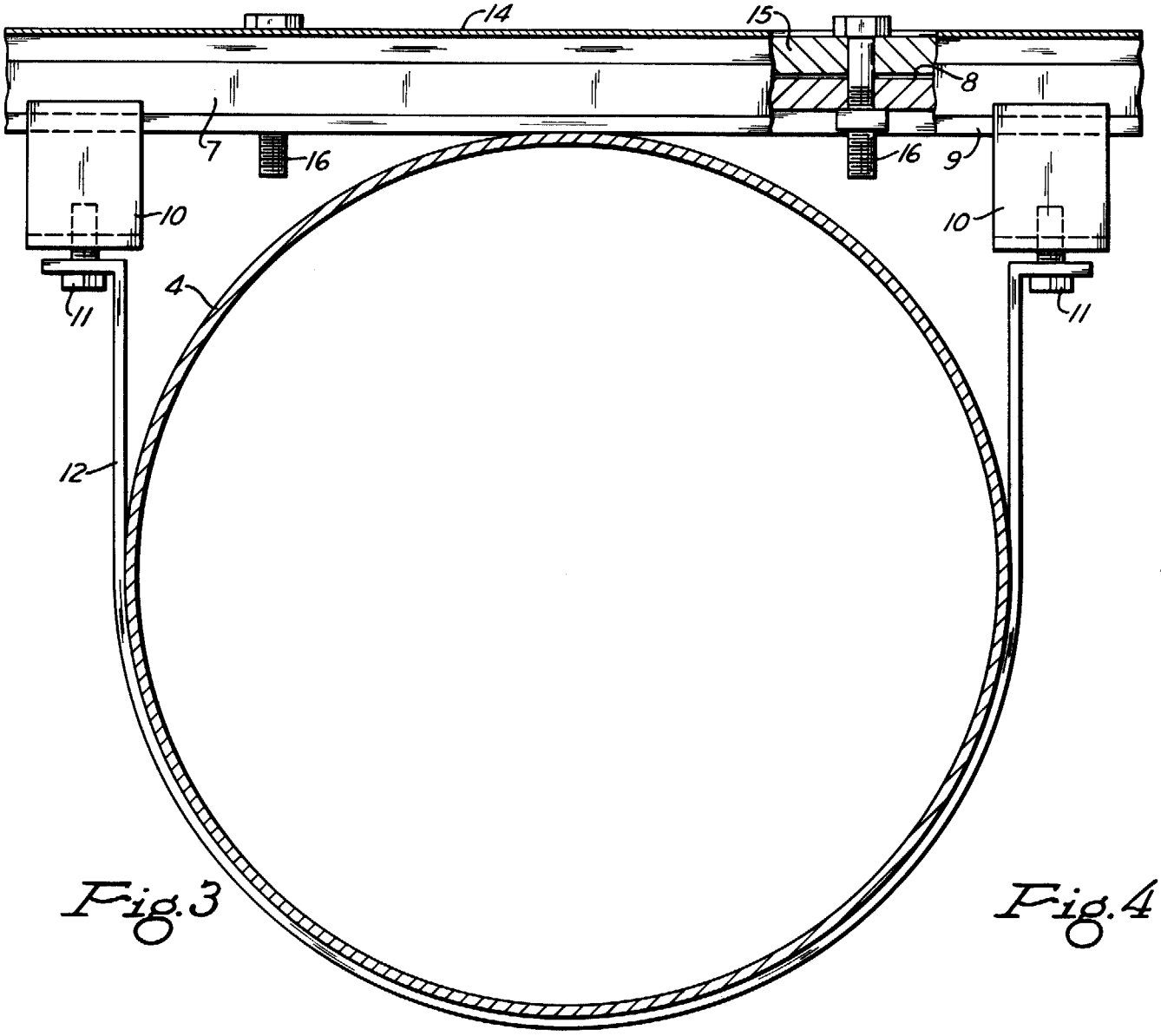
FIG. 3 is an enlarged cross section of a pontoon showing how it is attached to the overlying deck.

The pontoons are held in their proper positions by spaced parallel support bars extending across their tops. As shown in FIGS. 3 and 4, each of these bars 7 is provided with an upwardly opening channel 8 that extends lengthwise of the bar. The bottom of each bar has laterally projecting side flanges 9, the upper surfaces of which are engaged by the inturned upper ends of U-shaped clips 10 that hang down from the bars. Screwed into the bottoms of these clips are screws 11 that extend through the out-turned ends of metal clamping strips 12 extending around the bottom of tubes 4 to hold the bars and pontoons tightly together. It will be seen that by loosening the screws, the pontoons can be moved laterally along the support bars to any desired position. This is advantageous when it is found necessary to move a pontoon in this manner in order to avoid some obstruction below it in the tank. Also, by loosening the screws, the support bars and clamping strips 12 can be adjusted lengthwise along the pontoons to provide the correct distance between the bars.

Covering the spaces between support bars 7 are thin metal sheets 14, preferably aluminum, that extend the full length of the bars with their edge portions resting on the bars. These sheets are rigidly connected to each bar by means of a clamping bar 15 in channel 8 of the support bar. The clamping bar engages the upper surfaces of the edge portions of the sheets. Vertical bolts 16 extend down through the clamping bar, between the underlying sheets and through the support bar in order to clamp the edge portions of the sheets against the walls of the channel to hold the bars and sheets tightly together. Preferably, as shown in FIG. 4, the side walls of the channel are provided with steps 17 extending lengthwise of the bars, and the clamping bar is shaped to overlie the steps and also extend down between them. Consequently, the edge portions of the sheets are bent down over the steps in the channel to hold them tightly in place and also to form seals without the use of gaskets or other sealing material. The metal-to-metal seals are permanent and adequate for sealing against any pressure drop across the floating cover. Gas leakage associated with covers that use adhesives and caulking compounds is eliminated.

Figures 6, 7:
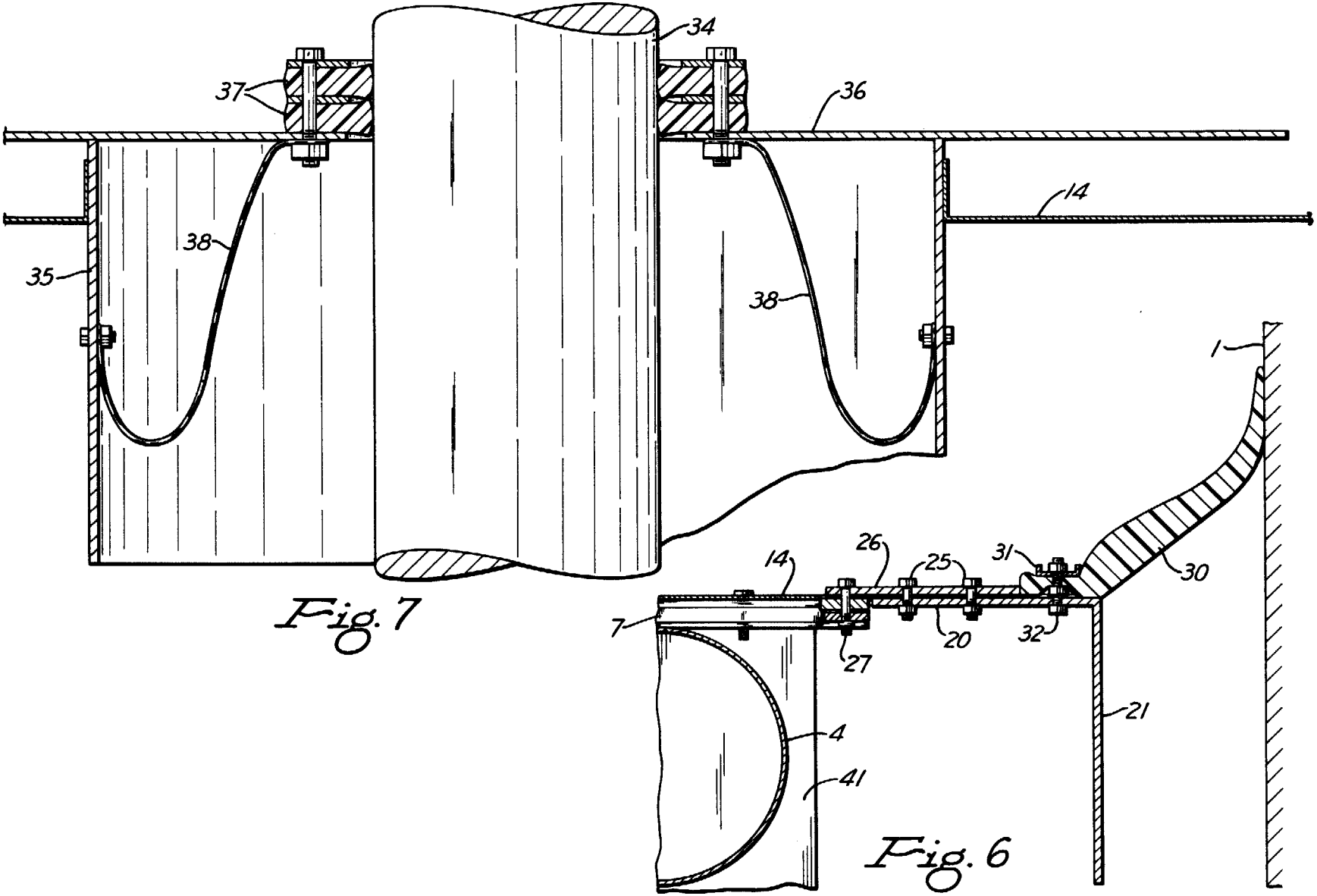
FIG. 6 is an enlarged fragmentary vertical section through an edge portion of the cover.
FIG. 7 is an enlarged fragmentary vertical section through the central portion of the cover.

The metal sheets 14 extend outwardly beyond the support bars and overlie a horizontal rim plate 20, from the outer edge of which a vertical rim plate 21 extends downwardly to a level near the level of the bottom of the pontoons as shown in FIGS. 2, 5 and 6. This vertical rim plate is attached by brackets 22 (FIGS. 1 and 5) to the ends of short tubular pontoons 23 located between the ends of the main pontoons. As shown in FIG. 6, the horizontal rim plate 20 is attached to the bottom of the metal sheets by means of bolts 25 extending down through short splice bars 26 that overlie the sheets and the ends of the clamping and support bars, to which the splice bars are attached by bolts 27. The vertical rim plate extends downwardly far enough to penetrate the liquid in the tank beneath the cover so that gas cannot escape around the lower edge.

To form a sliding seal between the circular deck and the side of the surrounding tank, a molded flexible sealing member 30 is clamped to the edge of the deck by clamping bars 31 and bolts 32. The flexible seal normally is inclined upwardly away from the rim plates, with its outer edge portion engaging the side of the tank. The seal also engages horizontal rim plate 20 around the edges of the metal sheets. Since the seal attempts to assume a position having less inclination than shown, it will remain in engagement with the tank even though the tank is out of round or the closed cover shifts horizontally. The seal also exerts a powerful self-centering action on the cover.

Since there is generally at least a central column 34 in such a tank, and sometimes many columns, the center of the cover or any other place where columns will be is provided with an opening lined with a vertical wall member 35 surrounding the column and spaced from it as shown in FIGS. 1, 2 and 7. Secured to the top of the wall members is a flat plate 36, the opening through which is somewhat larger than the column so that it will not engage the column. However, to prevent escape of volatiles up through that opening, a pair of superimposed flexible sealing rings 37 are mounted on the plate and snugly engage the column. As wall member 35 can slide across the bottom of plate 36, the seal does not interfere with lateral movement of the cover. When the cover rises in the tank, plate 36 pushes the sealing rings up the column. When the cover descends in the tank, the sealing rings will slide down the column by gravity unless they happen to stick at some point, in which case they are pulled down by a pair of normally slack metal cables 38 connecting plate 36 with the underlying wall member. These cables also electrically ground the plate to the rest of the cover.

Figure 9:
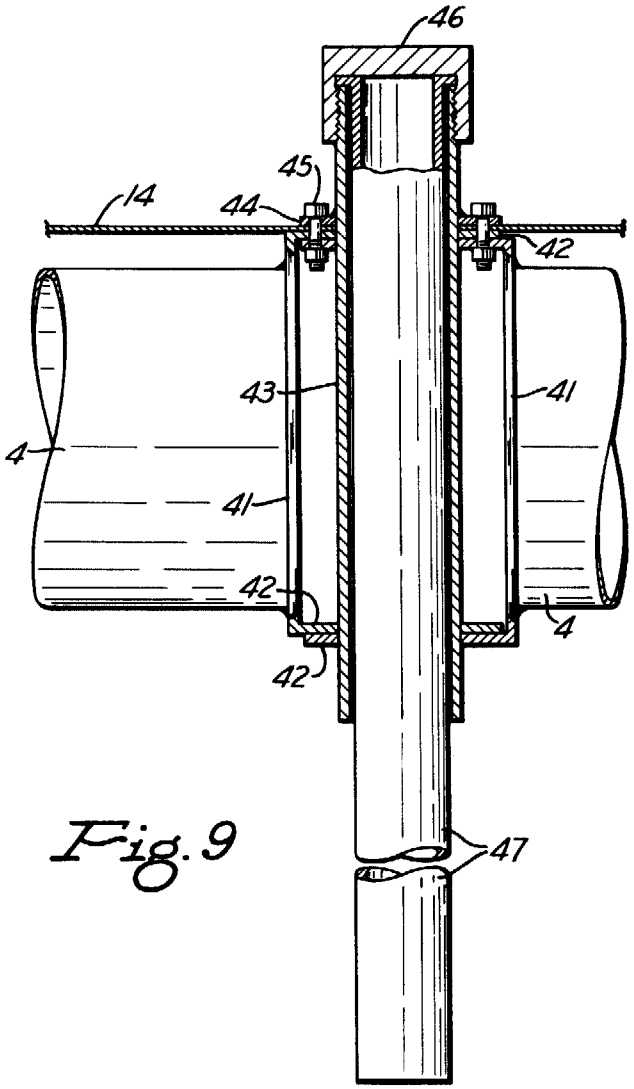
FIG. 9 is a vertical section taken on the line IX—IX of FIG. 8.
Figure 8:
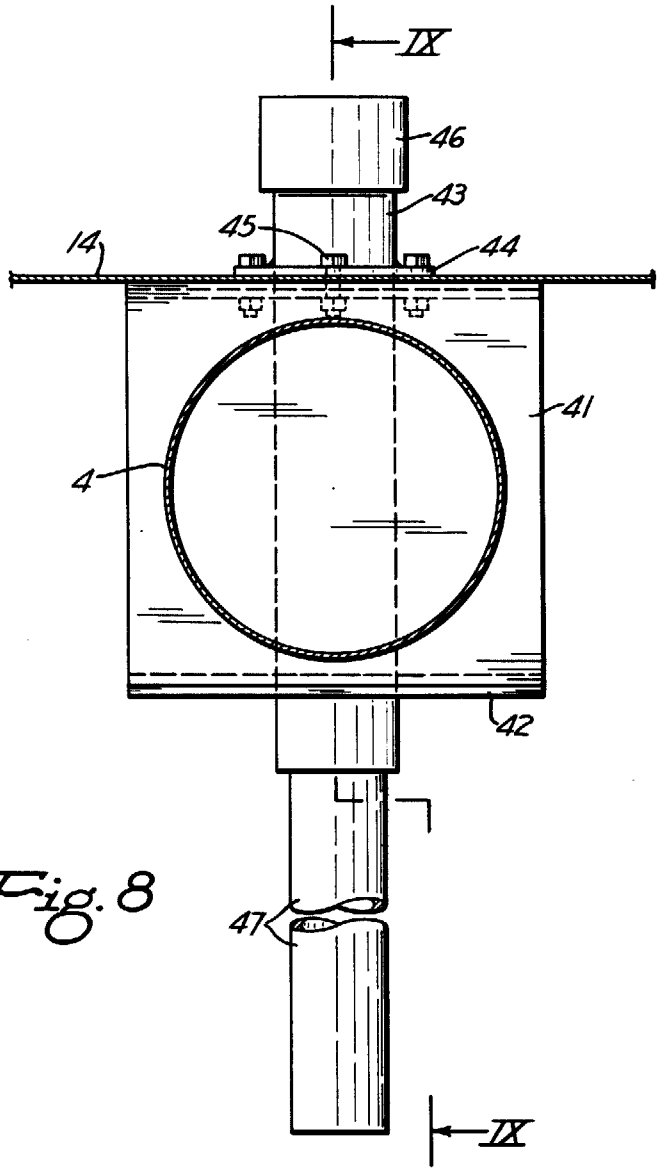
FIG. 8 is an enlarged fragmentary vertical section taken on the line VIII—VIII of FIG. 1.

Each of the long pontoons is formed from a plurality of the tubes 4 disposed in alignment with their ends spaced apart as shown in FIG. 9. The adjacent ends of these tubes are closed by the vertical webs 41 of brackets that have parallel upper and lower flanges 42. The flanges of one bracket overlap those of the adjoining bracket. These overlapping flanges are provided with aligned vertical openings registering with an opening in the deck above them. Extending through all of these openings is a vertical sleeve 43 that is held in place by a collar 44 welded to it and tightly secured by bolts 45 to the deck and upper bracket flanges 42. The sleeve holds the brackets together and also prevents adjoining brackets from tilting relative to each other. A threaded cap 46 on the upper end of the sleeve holds a flanged post 47 in place in the sleeve. The post extends a predetermined distance, such as 3½ feet, below the deck. When it is desired to clean out the tank the posts can be removed from the upper ends of the sleeves while the cover is still floating at a relatively high level in the tank, and longer posts can be substituted for them, after which the caps are replaced. Thereafter, when the tank is emptied the long posts will engage the bottom of the tank and hold the deck at a higher level than it ordinarily is held by the shorter posts when the tank is empty or nearly so. It is not desired to ever change posts, the sleeves 43 and caps 46 can be omitted, and posts with closed upper ends rigidly mounted in the space between the brackets by bolting them directly to the brackets.

The flanges 5 of the brackets on the ends of the pontoons likewise are provided with vertically aligned openings, and the horizontal rim plate and the metal sheets above it are provided with similar openings registering with those below. As shown in FIG. 5, sleeves 50 are rigidly mounted in these openings. The upper ends of the sleeves are threaded and provided with screw caps 51 (FIG. 1) that hold removable posts 52 (FIG. 5) in place.

The manner in which the metal panels 14 are clamped to the support bars results in the deck developing the full 100 percent strength of the panels. This means that the entire deck performs as if it were made from a single large sheet of aluminum.

With the lower ends of the post-receiving sleeves below the liquid level, vapors cannot escape up through them even when their caps are removed for changing posts.

A modification of the sheet-supporting and clamping bars is shown in FIG. 10, although the holding and sealing principle is the same as previously described. That is, the edge portions of the sheets are bent or deformed when the clamping and support bars are clamped together, whereby the sheets are held securely and permanent metal-to-metal seals are formed. Thus, a support bar 55 is provided in its upper surface with a pair of laterally spaced grooves 56 extending lengthwise of the bar, and a clamping bar 57 above it is provided with parallel ribs 58 that will fit into the grooves. The edge portions of deck sheets 59 are laid on the support bar and then the clamping bar is drawn down tightly against the sheets by bolts 60. This causes the ribs to deform the sheets into the grooves, which tightly holds the sheets and also forms seals to prevent escape of gas around the edges of the sheets.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A floating cover for inside a tank, comprising a plurality of laterally spaced horizontal tubular pontoons, a plurality of spaced parallel support bars extending across the tops of the pontoons and supported thereby, metal sheets covering the spaces between the bars and having edge portions resting on the bars, said sheets being spaced above the pontoons and extending across them, clamping bars engaging the upper surfaces of said edge portions of the sheets, vertical fasteners extending through the clamping and support bars for holding them tightly together to clamp the edge portions of the sheets between them to form a deck above the pontoons, and sealing means extending around said deck for sliding engagement with the side wall of a tank.

2. A floating cover according to claim 1, in which each support bar and the overlying clamping bar are provided with interengaging ribs and grooves extending lengthwise thereof with said edge portions of the sheets pressed into the grooves by said ribs.

3. A floating cover according to claim 1, in which the bottom of each support bar is provided with laterally projecting side flanges, said cover including hanger members engaging the upper surfaces of said flanges and hanging down below the support bars above the pontoons, and clamping bands extending up around each pontoon and fastened to said hanger members above it to connect said support bars and pontoons together.

4. A floating cover according to claim 1, in which the bottom of each support bar is provided with laterally projecting side flanges, said cover including clips engaging the upper surfaces of said flanges and hanging down below the support bars, the clips being disposed in a pair of parallel rows above each pontoon, and clamping bands extending up around each pontoon with each band fastened to a pair of said clips in the two rows above the pontoon for connecting said support bars and pontoons together.

5. A floating cover according to claim 4, in which each of said clips is of general U-shape with its upper ends turned toward each other and slidable along said support bar flanges, the bottom of each clip having a hole through it, the cover including a bolt extending through each clip hole and the adjoining clamping band to hold them together.

6. A floating cover according to claim 1, in which each of said support bars is provided with an upwardly opening channel extending lengthwise thereof and receiving the edge portions of adjoining sheets, and each clamping bar extends down into one of the channels and clamps the edge portions of the sheets therein against the inside of the channel.

7. A floating cover according to claim 6, in which the side walls of said channels are provided with steps extending lengthwise thereof, and said clamping bars are shaped to overlie said steps and also extend down between them, whereby said clamped edge portions of the metal sheets are [ vent ] *bent* between the adjoining clamping and support bars.

8. A floating cover according to claim 1, in which at least some of said pontoons include longitudinally spaced aligned tubular members, a pair of brackets secured to the opposed ends of adjacent tubular members, each bracket having upper and lower horizontal flanges disposed in overlapping relation with the flanges of the other bracket, said flanges and the metal sheet above them having aligned vertical openings therethrough, and a vertical sleeve mounted in said openings and projecting above said sheet and below the brackets, said cover including a post extending through each sleeve and downwardly below it, and a removable cap mounted on the upper end of the sleeve, said post being removable upwardly through the sleeve when said cap is removed, whereby the post can be replaced by a post of a different length.

9. A floating cover according to claim 8, including a collar secured to said sleeve above said deck, and fasteners extending down through the collar and underlying metal sheet and upper flanges of said brackets for connecting them rigidly together.

10. A floating cover for inside a tank, comprising a plurality of laterally spaced horizontal pontoons, a deck supported by the pontoons, at least some of said pontoons including longitudinally spaced aligned tubular members, a pair of brackets secured to the opposed ends of adjacent tubular members, each bracket having upper and lower horizontal flanges disposed in overlapping relation with the flanges of the other bracket, said flanges and deck having aligned vertical openings therethrough, and a vertical sleeve mounted in said openings and projecting above the deck and below the brackets, said cover also including a post extending through each sleeve and downwardly below it, and a removable cap mounted on the upper end of the sleeve, said post being removable upwardly through the sleeve when said cap is removed, whereby the post can be replaced by a post of a different length.

*11. A floating cover for inside a tank comprising:*

*a plurality of laterally spaced horizontal tubular pontoons,*

*a plurality of spaced parallel support bars extending across the tops of the pontoons and supported thereby, said support bars having clamping means disposed along the length thereof,*

*metal sheets covering the spaces between the support bars, said sheets being spaced above the pontoons and extending across them, the edge portions of said sheets being engaged by said clamping means and deformed thereby to form metal-to-metal seals defining a gas tight deck above the pontoons, and*

*sealing means extending around said deck for sliding engagement with the side wall of a tank.*

*12. A floating cover according to claim 11, in which the clamping means includes:*

*clamping bars engaging the edge portions of the metal sheets, and*

*fasteners extending through the support bars for holding the clamping bars and support bars tightly together for clamping the edge portions of the sheets between them to form the deck.*

*13. A floating cover according to claim 11, in which each support bar includes an upwardly opening channel extending lengthwise thereof and receiving the edge portions of adjacent sheets, and the clamping means includes clamping bars extending down into the channels to engage the edge portions of the sheets and form the deck.*

*14. A floating cover according to claim 11, in which the clamping means includes:*

*clamping bars engaging the edge portions of the metal sheets, and*

*fasteners holding the clamping bars and the support bars tightly together for clamping the edge portions of the sheets between them to form the deck.*

*15. A floating cover according to claim 14, in which the support bars and the clamping bars include interengaging ribs and grooves extending lengthwise thereof for engagement of the edge portions of the sheets between the ribs and grooves to form the deck.*

*16. A floating cover according to claim 11, including a plurality of clamping strips connected to the support bars and extending beneath the pontoons to tie the pontoons to the support bars.*

*17. A floating cover according to claim 16, in which the bottom of each support bar is provided with laterally projecting side flanges, said cover including hanger members engaging the upper surfaces of said flanges and connected to said clamping strips to tie the pontoons to the support bars.*

*18. A floating cover for inside a tank, comprising:*

*a plurality of laterally spaced horizontal tubular pontoons,*

*a plurality of spaced parallel support bars extending across the tops of the pontoons and supported thereby,*

*clamping strips connected to the support bars and extending beneath the pontoons to tie the pontoons to the support bars,*

*metal sheets covering the spaces between the support bars, said sheets being spaced above the pontoons and extending across them,*

*clamping bars extending along the length of the support bars and engaging the edge portions of the metal sheets,*

*fasteners holding the support bars and clamping bars tightly together to deform the edge portions of the sheets to form metal-to-metal seals defining a gas tight deck above the pontoons, and*

*sealing means extending around said deck for sliding engagement with the side wall of a tank.*

* * * * *